United States Patent

Berecz et al.

Patent Number: 5,147,167
Date of Patent: Sep. 15, 1992

[54] TWO PART GROMMET FOR SOFT PANELS

[75] Inventors: Imre Berecz, Rancho Santa Margarita; Derek Elmes, Chino Hills, both of Calif.

[73] Assignee: Microdot Inc., Chicago, Ill.

[21] Appl. No.: 731,114

[22] Filed: Jul. 15, 1991

[51] Int. Cl.⁵ ............... F16B 13/06; F16B 21/00
[52] U.S. Cl. .................. 411/44; 411/69; 411/339; 411/501
[58] Field of Search ............. 411/44, 57, 338, 339, 411/181, 179, 500, 501, 504, 69; 403/280, 334, 285

[56] References Cited

U.S. PATENT DOCUMENTS

| | | | |
|---|---|---|---|
| 375,677 | 12/1887 | Kyle | 411/339 |
| 2,147,922 | 2/1939 | Reiter | 411/339 |
| 2,647,432 | 8/1953 | Huck | 411/339 |
| 2,670,647 | 3/1954 | Jones | 411/339 |
| 2,957,196 | 10/1960 | Kreider et al. | 411/339 |
| 3,316,793 | 5/1967 | Mitchell | 411/339 |
| 3,443,473 | 5/1969 | Tritt | 411/181 |
| 3,494,246 | 2/1970 | Hensley | 411/339 |

*Primary Examiner*—Neill R. Wilson
*Attorney, Agent, or Firm*—Lyon & Delevie

[57] ABSTRACT

The disclosure relates to a grommet for relatively soft panels comprising male and female elements that mechanically interlock with one another. The male and female elements having complementary truncated conical surfaces that pinch and deflect a flanged portion of the skin of the panel into a complementary annular rib and groove thereby to fasten and minimize creep of the skin relative to the grommet. The male and female elements of the grommet are positively locked to one another by a relatively simple assembly operation.

3 Claims, 1 Drawing Sheet

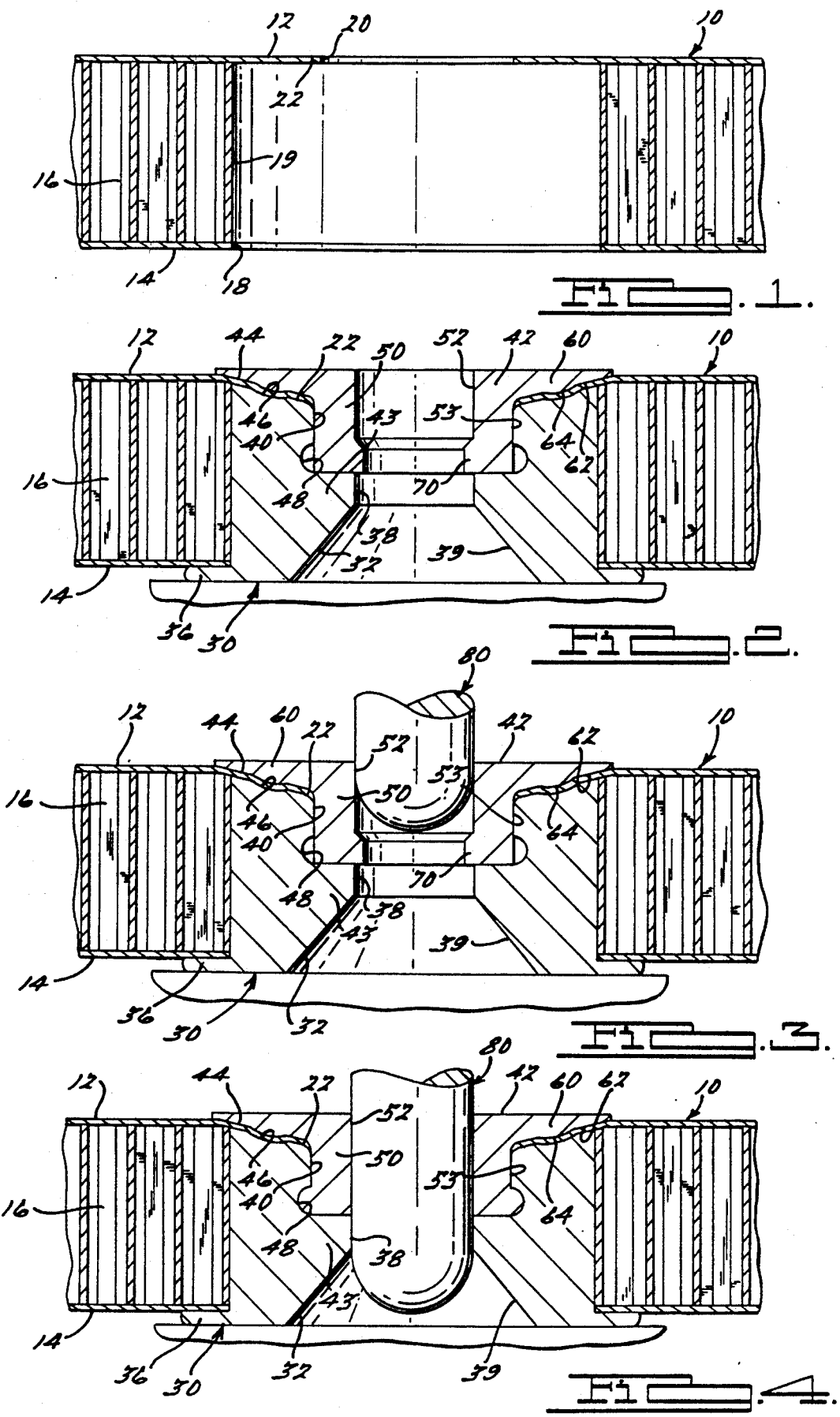

TWO PART GROMMET FOR SOFT PANELS

BACKGROUND OF THE INVENTION

Increased use of light weight panels in aircraft construction has emphasized the need for an improved grommet that facilitates anchoring and/or the attachment of other components to such panels. Such panels generally comprise a honeycomb or structural foam core having fiber reinforced plastic or aluminum skins of approximately 0.010 to 0.030 of an inch in thickness on opposite sides thereof.

Known fasteners, grommets or anchorage devices exhibit certain disadvantages when utilized with relatively soft structural materials. For example, undesirable compressive loads are applied to such panels when a screw type fastener is advanced thereinto. Excessive compressive load may cause the plastic material of the panel to creep, substantially decreasing clamp load resulting in a loose, structurally compromised joint.

Other known fastening or anchorage proposals have incorporated sleeves or inserts with teeth or projections that are displaced outwardly from a supporting sleeve so as to dig or bite into the surrounding material. The disadvantage of such fasteners is that the resistance to axial pull-out provided by the teeth or other projections is often insufficient to maintain joint integrity. This disadvantage is greatly magnified when the sleeve or insert is utilized in soft materials such as structural foam where the density of the foam material decreases towards the center of the panel.

SUMMARY OF THE INVENTION

The present invention relates a grommet suited for use in honeycomb panels, structural foam plastic panels, and other relatively soft materials having a relatively high strength skin thereon. The grommet comprises male and female elements that are inserted from opposite sides of the panel into a preformed hole in the panel. The male and female components of the grommet are thereafter coupled to one another.

A novel anchoring system engages the sheet material or skin on one face of the workpiece to positively position and retain the grommet while providing a substantially flush face on the panel.

BRIEF DESCRIPTION OF THE DRAWINGS

FIG. 1 is a cross-sectional view of a honeycomb panel that has been drilled for the acceptance of the grommet of the present invention.

FIG. 2 is a sectional view similar to FIG. 1, showing the grommet partially installed in the workpiece.

FIG. 3 is a view similar to FIG. 2 showing an installation tool in position to effect interlocking of the male and female components of the grommet.

FIG. 4 is a sectional view showing the completed installation of the grommet in the workpiece.

DETAILED DESCRIPTION OF THE PREFERRED EMBODIMENT OF THE INVENTION

As seen in FIG. 1 of the drawing, a honeycomb panel 10 comprises upper and lower composite plastic or aluminum skins 12 and 14, that are, for example, 0.030 inches thick. The skins 12 and 14 are bonded to a honeycomb substrate or core 16 made from, for example, paper, fiber, foam or the like. The outer skin 12 and 14 are bonded to the core 16 by conventional adhesive as is well known in the art.

The lower skin 14 and core 16 of the panel 10 are provided with aligned, circular aperture 18 and 19, respectively, the aperture 19 in the honeycomb 16 terminates at the upper skin 12 which is provided with an aperture 20 that is coaxially related to the apertures 18 and 19 but of relatively smaller diameter so as to define an annular flange 22.

As seen in FIGS. 2-4 of the drawings, a grommet 30 in accordance with the present invention comprises a female element 32 disposed within the apertures 18 and 19 in the skin 14 and honeycomb 16, respectively, of the panel 10. The female element 32 has a radially outwardly extending flange 36 that overlies the skin 14 of the panel 10. The female element 32 is provided with a central bore 38 having a frusto conical chamfer 39 for the acceptance of a fastener (not shown) and a counterbore 40 for the acceptance of a male element 42. The counterbore 40 terminates in a radial flange 43 that provides for seating of the male element 42.

In accordance with one feature of the instant invention, the female element 32 is provided with a conical end face 44 extending at an angle of 15° relative to the control axis thereof with an annular concave groove 46 therein for a purpose to be discussed. The angle of the end face 44 is preferably in the range of 10° to 30° depending upon the physicals of the materials used for the grommet 30. In addition, the female element 32 has an annular groove 48 at the bottom of the counterbore 40 for locking of the male element 42 thereto, as will be described.

The male element 42 has a cylindrical portion 50 with a central bore 52 therein of like diameter to the bore 38 in the female element 32. The cylindrical portion 50 of the male element 42 has an outside cylindrical surface 52 of a diameter complementary to the inside diameter of the counterbore 40 in the female element 32.

In accordance with one feature of the invention, the male element 42 is provided with a radial flange 60 having a generally truncated conical inner face 62 complementary to the conical end face 44 on the female element 32. The inner face 62 of the male element 42 has an annular convex rib 64 complementary to the concave groove 46 in the female element 32 to positively trap the flange portion 22 of the upper skin 12 on the panel 10 therebetween.

In accordance with another feature of the present invention, the male element 42 is provided with a protrusion 70 on the radially inner surface of the cylindrical portion 50 thereof that extends radially inwardly to a diameter smaller than the diameter of the bore 52 therein. As best seen by comparing FIGS. 2, 3 and 4, the protrusion 70 is extruded radially outwardly by a tool 80, as seen in FIG. 4, into the annular recess 48 in the female element 32 thereby to lock the male and female elements 42 and 32 to one another.

From the foregoing it should be apparent that the grommet of the instant invention is easily assembled yet positively locked to a panel. The truncated conical surface on the flange of the male element deflects a flanged portion of the skin of the panel into a complementary annular groove in the female element thereby to fasten and minimize creep of the skin relative to the grommet. The male and female elements of the grommet are positively locked to one another by a relatively simple assembly operation.

While the preferred embodiment of the invention has been disclosed, it should be appreciated that the invention is susceptible of modification without departing from the scope of the following claims.

We claim:

1. A grommet for a panel having a core with a skin on an exterior surface thereof, the core of said panel having a first hole therethrough, and the skin of said panel having a second hole relatively smaller than said first hole and coaxially aligned therewith, said grommet comprising a female element having a cylindrical outer surface acceptable in the hole in the core of said panel and a central bore, said female element having a counterbore of relatively larger diameter than said central bore and a conical end face extending between the cylindrical outer surface and counterbore thereof, said female element having an annular radially outwardly extending groove at the end of the counterbore therein, and a male element having a cylindrical portion with an outer diameter complementary to the counterbore in said female element and to the second hole in the skin of said panel, the cylindrical portion of said male element having a central bore of a diameter equal to the central bore in said female element, said male element having an annular flange extending radially outwardly from the cylindrical portion thereof with a conical axially inner face complementary to the conical end face on said female element so as to pinch the skin of said panel therebetween when said male and female elements are assembled, said male element having an annular protrusion extending radially inwardly from the central bore thereof in radial alignment with the annular groove in said female element so as to be deformable radially outwardly thereinto to lock said male and female elements to one another and to the skin of said panel.

2. A grommet in accordance with claim 1 wherein the conical surfaces on said male and female elements have an axially aligned annular rib and groove, respectively so as to deform and pinch the skin portion of said panel therebetween.

3. A grommet in accordance with claim 1 wherein the conical end face on said female element and the conical axially inner face on said male element are parallel to one another and extend at angles of from 10° to 30° relative to the central axis of the grommet.

* * * * *